United States Patent [19]
Bolle et al.

[11] Patent Number: 6,064,753
[45] Date of Patent: May 16, 2000

[54] SYSTEM AND METHOD FOR DISTORTION CONTROL IN LIVE-SCAN INKLESS FINGERPRINT IMAGES

[75] Inventors: Rudolf Maarten Bolle, Bedford Hills; Robert Steven Germain, Tuckahoe; Richard Lawrence Garwin, Scarsdale; James Lewis Levine, Yorktown Heights; Sharathchandra Umpathirao Pankanti, Mt. Kisco; Nalini Kanta Ratha, White Plains; Michael Alan Schappert, Fishkill, all of N.Y.

[73] Assignee: International Business Machines Corporation, Armonk, N.Y.

[21] Appl. No.: 08/872,639

[22] Filed: Jun. 10, 1997

[51] Int. Cl.$^7$ .................................................. G06K 9/00
[52] U.S. Cl. ..................... 382/125; 382/126; 382/127; 340/825.34; 356/71
[58] Field of Search .................. 382/115–116, 120–121, 382/124–127; 340/825.3, 825.31, 825.34; 356/71; 250/227.11, 227.2; 235/380, 382, 382.5; 348/156; 324/686, 692, 693; 345/173–175

[56] References Cited

U.S. PATENT DOCUMENTS

| | | | |
|---|---|---|---|
| 3,200,701 | 8/1965 | White | 88/14 |
| 4,120,585 | 10/1978 | DePalma et al. | 356/71 |
| 4,151,512 | 4/1979 | Riganati et al. | 382/125 |
| 4,310,827 | 1/1982 | Asai | 382/125 |
| 4,704,909 | 11/1987 | Grahn et al. | 73/862.04 |
| 4,817,183 | 3/1989 | Sparrow | 382/125 |
| 4,832,485 | 5/1989 | Bowles | 356/71 |
| 4,857,916 | 8/1989 | Bellin | 340/825.34 |
| 5,140,642 | 8/1992 | Hsu et al. | 382/124 |
| 5,467,403 | 11/1995 | Fishbine et al. | 382/116 |
| 5,546,471 | 8/1996 | Merjanian | 382/126 |
| 5,583,933 | 12/1996 | Mark | 379/355 |
| 5,732,148 | 3/1998 | Keagy et al. | 382/115 |
| 5,812,252 | 9/1998 | Bowker et al. | 340/825.34 |

FOREIGN PATENT DOCUMENTS

| | | |
|---|---|---|
| 2736179 | 6/1995 | France . |
| 2960708 | 4/1996 | Germany . |
| 2185937 | 8/1987 | United Kingdom . |

OTHER PUBLICATIONS

Nalini K. Ratha, Shaoyun Chen and Anil K. Jain, "Adaptive Flow Orientation–Based Feature Extraction in Fingerprint Images," Pergamon, Pattern Recognition, vol. 28, No. 11, pp. 1657–1672, 1995.

*Primary Examiner*—Bhavesh Mehta
*Attorney, Agent, or Firm*—Louis J. Percello; F. Chau & Associates, LLP

[57] ABSTRACT

A computer system and method determines the force and/or torque applied during the image acquisition stage of a biometric characteristic. Images with very high or very low pressure or high shear torque are rejected and user/operator is notified to re-acquire the image. Alternatively, the application of force and torque by the subject is restricted mechanically so that the images are acquired while the force and/or torque are within acceptable ranges.

19 Claims, 10 Drawing Sheets

FIG. 3A PRIOR ART — HIGH PRESSURE

FIG. 3B PRIOR ART — HIGH TORQUE

FIG. 3C PRIOR ART — UNDISTORTED

SYSTEM AND METHOD FOR DISTORTION CONTROL IN LIVE-SCAN INKLESS FINGERPRINT IMAGES

FIELD OF THE INVENTION

This invention relates to the field of automated biometrics where through the means of touch sensing, a subject gives an impression of a body part. This is done for authenticating or identifying the subject, possibly over a network. More specifically, the invention relates to a system and method for controlling distortion in live-scan inkless fingerprint images and rejecting fingerprint images that are acquired under large distorting forces.

BACKGROUND OF THE INVENTION

The field of automated biometrics is concerned with establishing or authenticating the identity of a subject (in general a human being) based upon characteristics that are in the possession of the subject. This process can be performed remotely over a network. A whole spectrum of biometric identification and authentication characteristics are biologically associated with human beings (and other animate objects), and, depending on the expressive power of the characteristic, more or less uniquely distinguish a subject from other subjects. A set of these types of characteristics are based on the skin pattern and/or the form of body parts. Examples of these biometric identifiers are: fingerprints, palm prints, hand prints; while more esoteric ones are: toe prints, ear prints, tongue prints, et cetera. The means of acquiring these types of characteristics is through a form of contact sensing. This contact sensing inherently effects the biometric characteristic and may in fact distort and corrupt the characteristic.

There exist systems that accomplish automatic verification or identification of a person (subject) using his/her fingerprint. A fingerprint of a person comprises a distinctive and unique ridge pattern structure. For identification/verification purposes, ridge pattern structure could be characterized by endings and bifurcations of the individual ridges. These features are popularly known as minutiae.

Figure 1A:
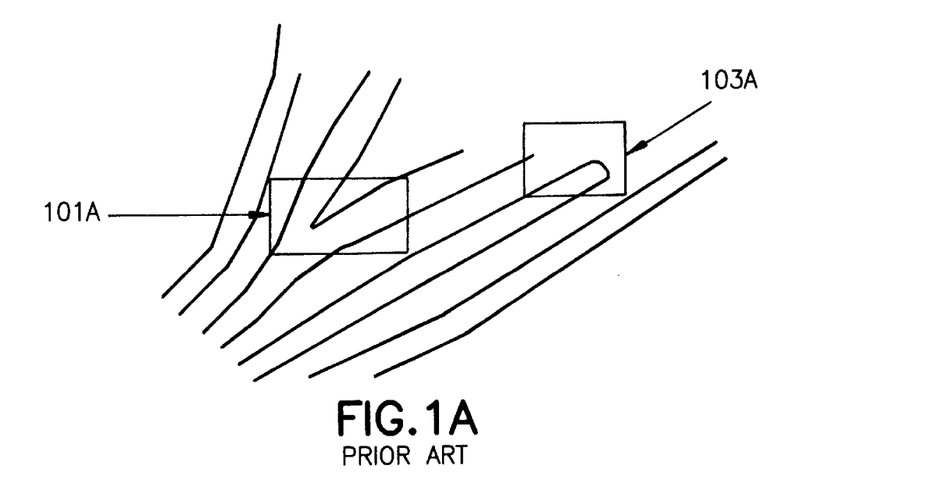
FIG. 1A is a prior art drawing of a typical biometric characteristic, namely a fingerprint.
Figure 1B:
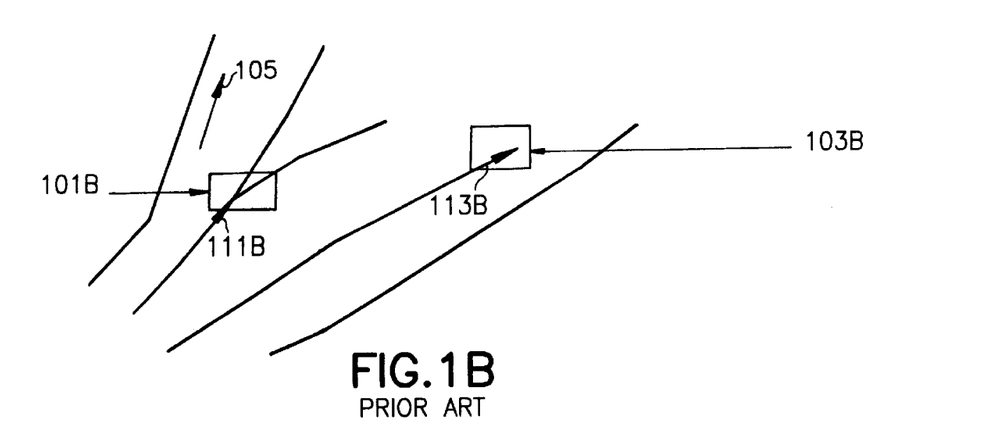
FIG. 1B is a prior art drawing showing minutia of the fingerprint in FIG. 1A.

An example of part of a fingerprint is shown in FIG. 1A. The minutiae for the fingerprint shown in FIG. 1A are shown in FIG. 1B as being enclosed by "boxes." For example, box 101B (in FIG. 1B) indicates a bifurcation minutia of a bifurcated ridge 101A in FIG. 1A while box 103B indicates a ridge ending minutia of ridge 103A in FIG. 1A. Note that minutiae on the ridges in fingerprints have directions (also called orientations) 105 (FIG. 1B) associated with them. The direction of the minutia at a ridge ending 103B is the direction 113B in which the end of the ridge points. The direction of a bifurcation minutia 101B, on the other hand, is the direction 111B in which the bifurcated ridge points. Minutiae also have locations which are the positions of the minutiae on the fingerprint with respect to some coordinate system (not shown).

The prevalent fingerprint identification and verification methods are based on these minutiae features. Identification/authentication systems that use minutiae features need to process the fingerprint images to obtain accurate and reliable minutiae features to effectively determine or verify the identity of a person.

Figure 2:
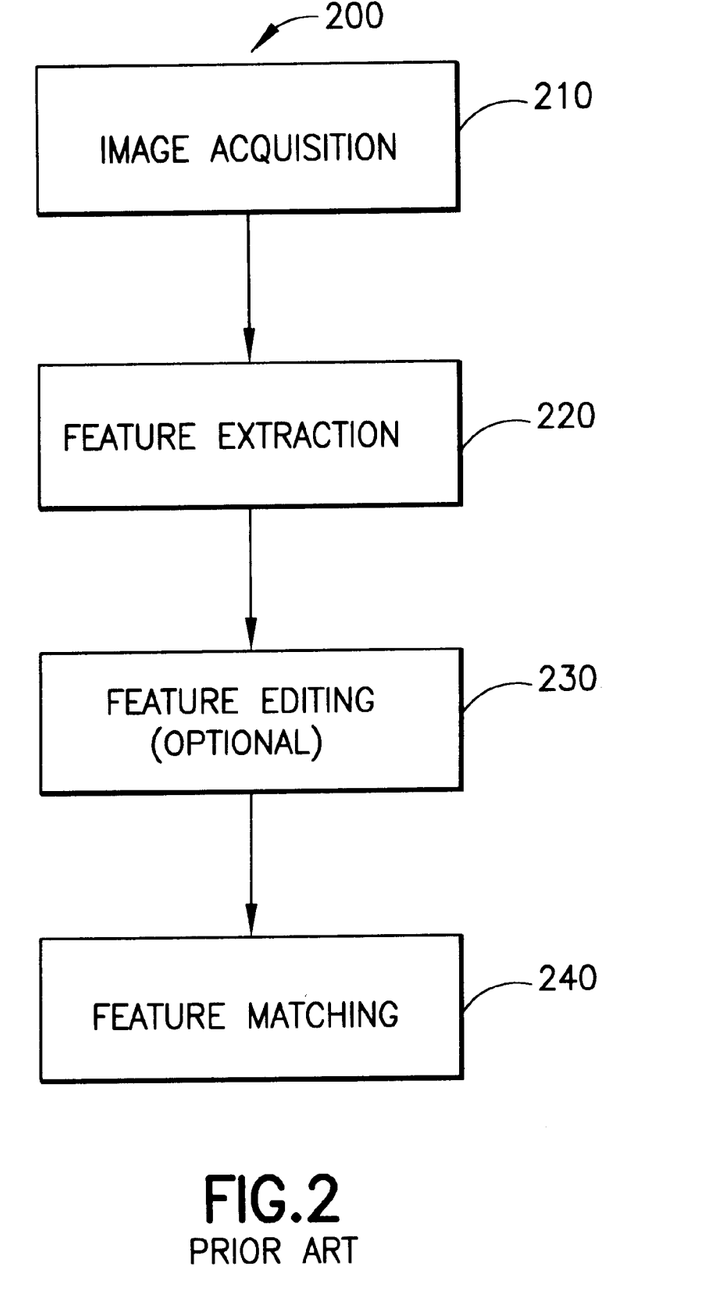
FIG. 2 is a flow chart showing the method steps performed by typical prior art systems.

FIG. 2 is a flow chart showing the steps generally performed by a typical prior art system 200. In step 210, the image is acquired. This acquisition of the image could either be through a CCD camera and framegrabber interface or through a document scanner communicating with the primary computing equipment. Typically, the image is acquired through some means of contact sensing. Once the image is acquired into the computer memory or onto disk, relevant features minutia features are extracted (220). Not all of the features thus extracted are reliable. Some of the unreliable features are optionally pruned (step 230), e.g., manually edited. The resultant reliable features are used for matching two fingerprint images (step 240), that is, matching the acquired fingerprint image with stored minutiae representations of previously acquired fingerprint images.

The following reference further describes examples of the state of the prior art:

N. K. Ratha, S. Chen, and A. K. Jain,

Adaptive flow orientation based texture extraction in fingerprint images,

Pattern Recognition, vol. 28, no. 11, pp. 1657–1672, November 1995.

This reference is incorporated herein by reference in its entirety.

It is often desirable to use inkless methods of acquiring fingerprint images. Such systems require the fingerprint to be placed on a prism surface and, using the frustrated internal reflection method, the image is captured by a video camera. U.S. Pat. No. 5,467,403, for example, to Fishbine et al. discloses the means and methods for live-scan fingerprint image acquisition. This method of image acquisition is also known as the live-scan method.

STATEMENT OF PROBLEMS WITH THE PRIOR ART

The use of contact sensing to obtain a biometric characteristic pattern has the associated problem that the sensing inherently distorts the pattern. The subject can actively distort the pattern if he or she so wishes which is especially true for remote, networked authentication or identification. One of the sources of distortion is that the subject has the ability of exerting pressures and forces during the image acquisition. U.S. Pat. No. 4,120,585 to DePalma and King discloses a fingerprint image acquisition apparatus using frustrated internal reflection with a pliable optical prism. The prism will deform to enlarge the contact surface with the finger and a certain amount of pressure has to be exerted by the subject.

For the live-scan method of fingerprint image acquisition, the subject exerts different kinds of pressures and forces. The skin, being elastic, deforms when forces are applied to it. The image distortions caused by these pressures and forces (i.e., excessive force and torque) have a significant negative impact on the matching subsystem of an automatic fingerprint identification/authentication systems. To accommodate for small variations in a fingerprint, a matcher provides for tolerances in the shift of the fingerprint features. Large distortions would demand large tolerances resulting in decrease in system accuracy or increase in the false acceptance rate and false rejection rate. Even when pressure and force applied during acquisition is moderate, a shear torque can distort the the acquired biometric characteristic irregularly in different parts of the characteristic pattern. This results in an image of the characteristic biometric which is unevenly and nonlinearly distorted over the biometric pattern.

Figure 3A:
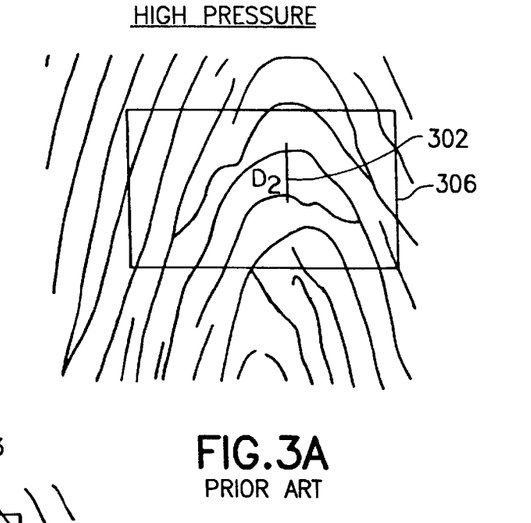
FIG. 3A is a prior art drawing of a typical distorted fingerprint image where the distortion is due to excessive pressure.
Figure 3B:
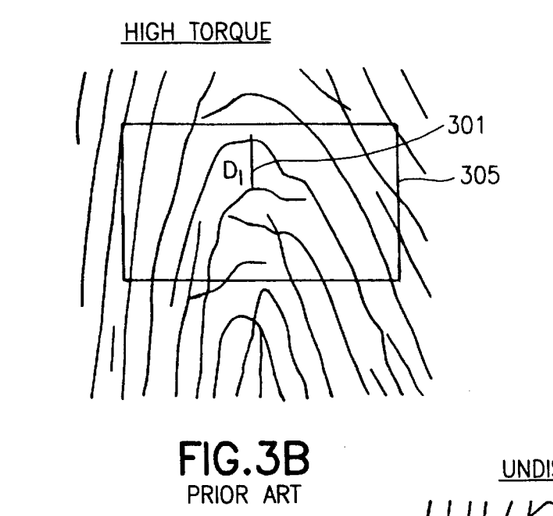
FIG. 3B is a prior art drawing of a typical distorted fingerprint image where the distortion is caused by excessive shear torque.
Figure 3C:
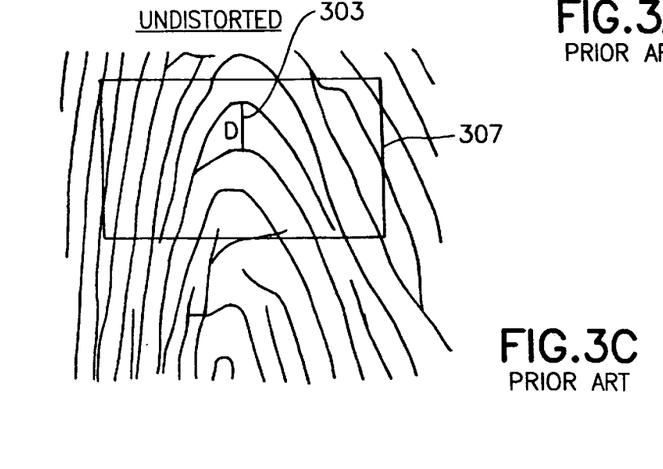
FIG. 3C is a prior art drawing of a typical undistorted fingerprint image.

The problems associated with distortion of fingerprints are illustrated through the FIGS. 3–4. FIG. 3A shows a fingerprint captured under high pressure and FIG. 3B shows the same fingerprint captured under high torque. FIG. 3C shows the undistorted finger. The images under the boxes

Figure 4A:
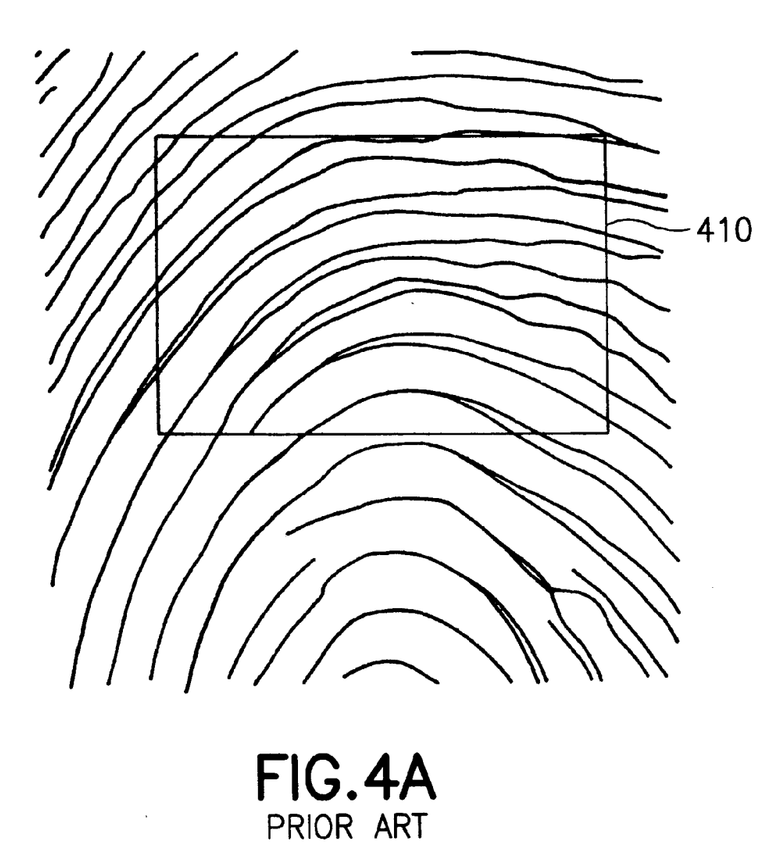
FIG. 4A shows the highlighted overlap of the commonalities of fingerprints in FIGS. 3A and 3B.
Figure 4B:
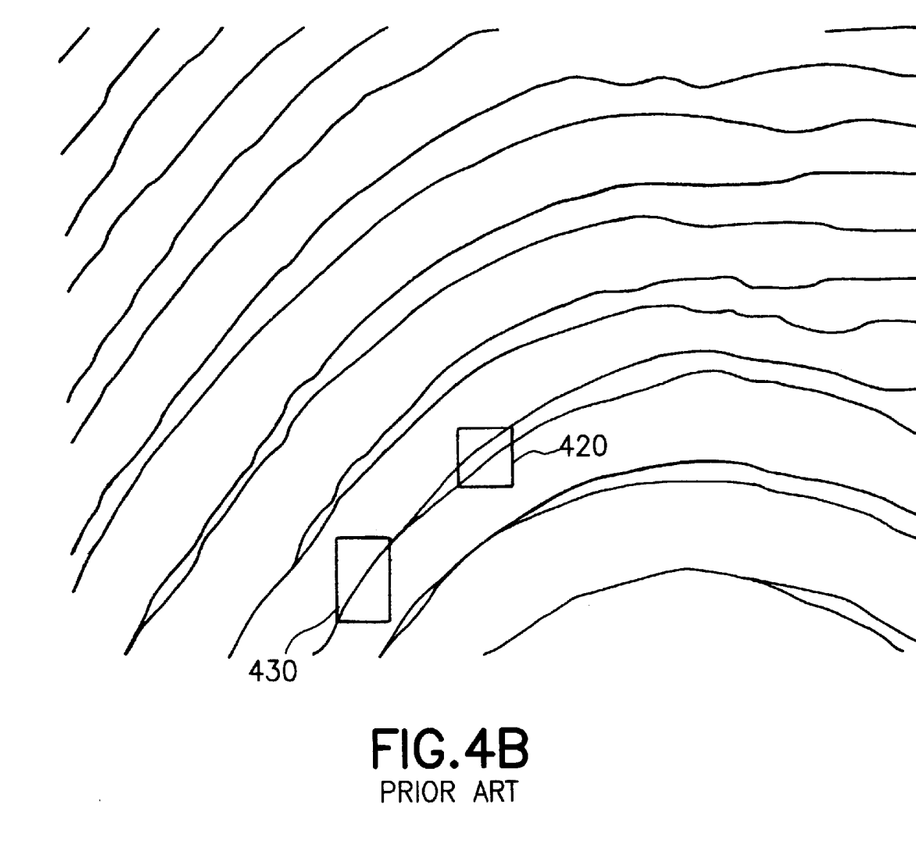
FIG. 4B is a detail of the differences between fingerprints of FIGS. 3A and 3B.

305, 306 and 307 show a significant change in the ridge structure in terms of their inter ridge distance 301, 302 and 303 respectively. FIG. 4A is the "best" matching overlap of the two images after thinning the gray scale images. A portion of the overlap image inside box 410 has been zoomed in FIG. 4B to highlight the shift in ridges due to force/torque variation. The ridges fully overlap inside the box 430 and due to distortion start splitting inside the box 420. To accommodate for such distortions, the fingerprint matcher has to have large tolerances in matching minutiae which negatively effects the recognition accuracy of biometric authentication and identification systems.

The following references are incorporated herein by reference in their entirety:

1. Method for optical comparison of skin friction-ridge patterns, to W. White, U.S. Pat. No. 3,200,701, issued Jan. 29, 1962.
2. Fingerprint Identification System Using a Pliable Optical Prism, to V. A. DePalma and R. W. King, U.S. Pat. No. 4,120,585, issued October 1978.
3. Portable Fingerprint Scanning Apparatus for Identification Verification, to G. M. Fishbine et al., U.S. Pat. No. 5,467,403, issued November 1995.

OBJECTS OF THE INVENTION

An object of this invention is an improved pressure and force sensing mechanism which ensures that contact sensing of a biometric characteristic is achieved with minimal distortion of the true biometric pattern.

Another object of this invention is an accurate and reliable fingerprint acquisition system that detects application of excessive force and torque during the image acquisition.

A further object of this invention is an accurate and reliable fingerprint acquisition system that restricts the application of force and torque to be in an acceptable range during the image acquisition.

A further object of this invention is an accurate and reliable fingerprint acquisition system that restricts the application of force and torque to be in an acceptable range during the image acquisition in an remote, possibly unattended, system and communicates over a network to a server using well known technologies.

SUMMARY OF THE INVENTION

The invention is a computer system and method that determines the force and torque applied during the image acquisition stage of a biometric characteristic. While the invention is specifically concerned with fingerprints as a biometric characteristic, it also applies to other characteristics that are measured through contact.

In one preferred embodiment, the force and torque exerted by the subject is continuously monitored by a computer while the image of the biometric is optionally displayed. At the instant of grabbing the image (as per user choice), the force and torque are analyzed by the computer. Images with very high or very low pressure or high shear torque are rejected. The user/operator can be notified to re-acquire the image.

In other embodiments, the application of force and torque by the subject is restricted mechanically so that most images are acquired while the force and/or torque are within acceptable ranges.

BRIEF DESCRIPTION OF THE DRAWINGS

The foregoing and other objects, aspects and advantages of this invention will be better understood from the following detailed description of preferred embodiments of the invention with reference to the drawings that include the following.

DETAILED DESCRIPTION OF THE INVENTION

In person identification/authentication based on automated biometrics, imaging of the common biometrics such as a fingerprint, a palm print, or a handprint involves contact sensing. Other esoteric biometrics include toe prints, ear prints and tongue prints where contact sensing-based imaging may be involved. In contact sensing-based imaging, the force and torque applied during the contact play an important role in the quality of the sensed image for automatic processing. This invention insures that the force and/or torque applied during contact are within acceptable ranges to produce a higher quality image. In a preferred embodiment of this invention, the force and torque are monitored during contact and images are taken within a range of force and/or torque, In other embodiments of the invention, the force and/or torque applied is limited during the image acquisition.

Figure 5:
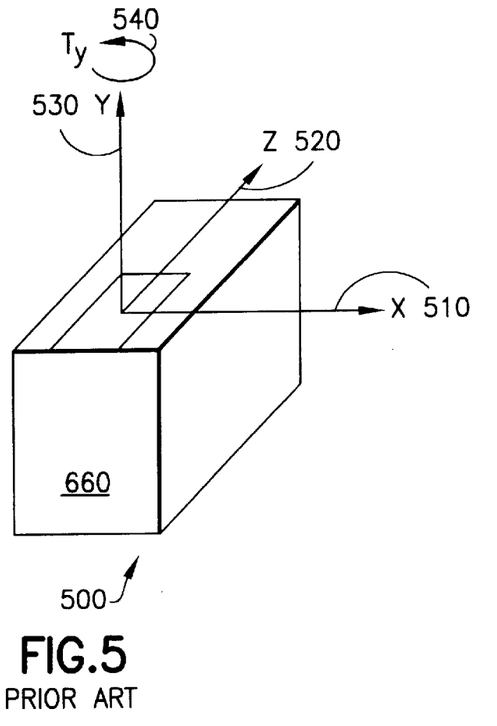
FIG. 5 shows one coordinate system which is used in this invention to express the forces and torques directions with respect to the biometric image acquisition system.

More specifically referring now to the drawings, and more particularly to FIG. 5, one preferred coordinate system is shown that is used by the present invention. The direction of force 530 normal to a live-scan equipment 660, a torque direction 540 about the normal force 530, and an orthogonal x 510 and z 520 direction of force are also shown. These coordinate systems are well known and any equivalents thereof can be used.

Figure 6:
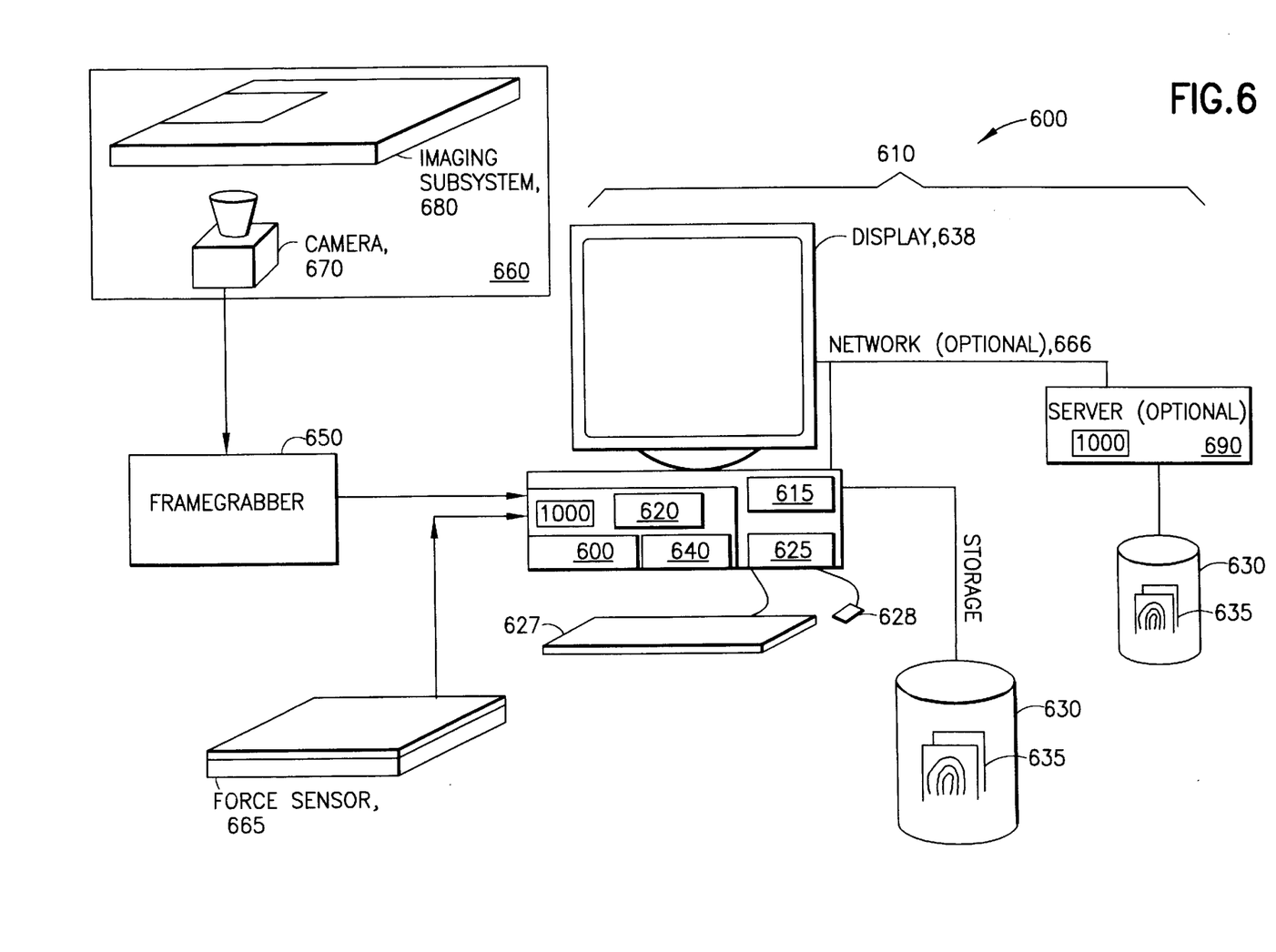
FIG. 6 is a block diagram of one preferred embodiment of subject identification/authentication system with a force sensor of this invention, including one networked embodiment of this invention.

FIG. 6 is a block diagram that shows a general image acquisition and processing system 600 for fingerprint identification or authentication. This block diagram representation shows a general computer hardware environment that is used for processing. An example of the computer 610 may be one of International Business Machines Corporation (IBM) Personal System/2 (PS/2) family of Personal Computers, a RISC System/6000, or Power Parallel System (SP/x), or equivalent. The system 600 includes one or more central processing units (CPU) 615, which may conform to any general computer architecture (e.g., Intel Pentium or a reduced instruction set microprocessor.) The CPU 615 is attached to a system bus (not shown) to which are attached a read/write and/or random access memory (RAM) 620 that can include one or more cache memories, a read only memory (ROM) 640, and an input/output adapter 625. The RAM 620 typically provides temporary storage for one or more application program processes containing code and/or data while the ROM 640 typically includes the basic input/output system (BIOS) code. Direct Access Storage Devices (DASDs), here represented by hard disk drive 630, are also connected to the CPU by an appropriate adapter (not shown.) The hard disk drive 630 typically stores the computer's operating system (OS), such as IBM's OS/2 operating system, and various application programs, data, and/or databases. These databases include intermediate results and fingerprint image data 635. Optionally these storage units 630 can be remote and connected through an optional network 666 using well known technologies. In this network embodiment, the remote server 690 is a computer similar to 610. The remote server communicates with the local host/client using LAN, WAN telephone, radio link, or other standard telecommunication networks 666 that are well known. Typically, the input/output adapter 625 has attached to it a keyboard 627, a mouse 628, and/or other user interface devices (not shown).

The system 600 also can include a display 638, here represented as a cathode ray tube (CRT) display, but which may be a liquid crystal display (LCD) or other suitable display and/or graphic user interface (GUI) 638. The display 638 is connected to the system bus via a display adapter (not shown).

The computer 610 is also interfaced with a framegrabber 650 and an image acquisition device, e.g., a live-scan equipment 660, comprising a camera 670 and imaging subsystem 680 arrangement to capture the fingerprint image into the computer memory/disk 630.

A force detecting device 665 senses force and/or torque applied to the fingerprint image capturing system. The system shown in FIG. 6 uses a force sensor from TouchMate which gives out force and torque in digital form with reference to a coordinate system based at the center of the sensor. A typical prior art coordinate system is shown in FIG. 5. In this arrangement, the live-scan fingerprint imaging device 660, is located on the top of (either attached or unattached) the force sensor 665 (not shown in FIG. 6). In this manner, forces/torques experienced by the imaging device 660 are transferred to the force sensor 665 to be measured. The force sensor produces the stream of force data and the computer with the help of a suitable interface reads the force and torque stream of data.

Personal System/2, PS/2, OS/2, RISC System/6000, Power Parallel System, SP/x, and IBM are trademarks of the International Business Machines Corporation. Intel Pentium is a trademark of the Intel Corporation; and TouchMate is a trademark of MicroTouch Systems Inc.

A typical inkless fingerprint scanner uses a prism and total frustrated internal reflection techniques to image the finger touching the prism surface. (For example see U.S. Pat. Nos. 3,200,701 to W. White and 5,467,403 to Fishbine et al.) The current invention discloses the employment of different kinds of force/torque sensing and/or limiting techniques to measure the force being applied. FIG. 6 shows an external force sensor 665 on which the inkless scanner 660 is placed to measure the force and torque being applied during fingerprint image acquisition. This sensor 665 measures the forces exerted by the subject during contact sensing of the subject's fingerprint with respect to the coordinate system 500 shown in FIG. 5. The exerted force perpendicular to the prism surface is the force Fy in the negative y-direction 530; while the forces parallel (510, 520) to the prism are expressed by Fx and Fz. The torque Ty (540) is the force times unit of length around the y-axis, 530. The measurement/control of the force and torque during image acquisition is described in FIG. 10.

While FIG. 6 describes one preferred embodiment of this invention applicable to a fingerprint image acquisition device, the invention can be used in any general biometric acquisition system.

Figure 7:
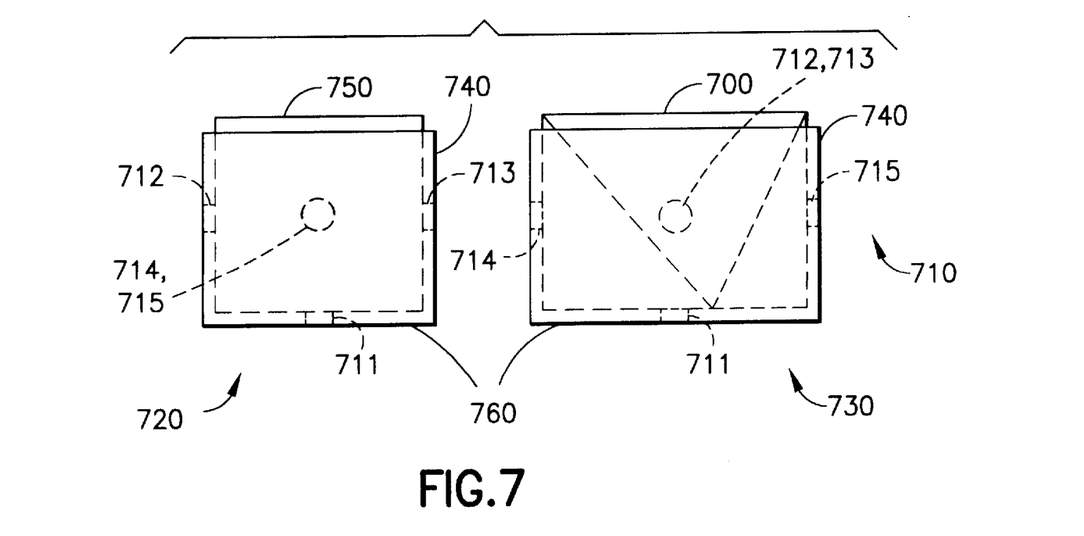
FIG. 7 is a block diagram of an alternative embodiment of a force sensor in the biometric image acquisition system.

FIG. 7 shows a prism 700 for image acquisition device 660 which is instrumented by force sensors 710. In one preferred embodiment there are five force sensors (711, 712, 713, 714, 715) on the centers of the unexposed (to the pressure of the biometric, e.g. finger tip) sides of the prism 700. The front view is shown in 720 with sensors 712, 711, and 713; the side view is shown in 730 with sensors 714, 711, 715. A prism holder 740 holds this assembly of prism and five sensors. The prism surface 750 is the contact imaging sensing plane, while 760 is the sensor support frame. One side of each force sensor is attached to the prism holder 740 and the other side of each force sensor is attached to the sensor support frame 760. Fy is given by force sensor 711; Fx is given by force sensors 712 and 713; Fz is given by force sensors 714 and 715. As can be seen by a person skilled in the art, the torque Ty 540 can be derived by adding additional sensors to measure localization of force (not shown in the figure). Other configurations of force sensors are also envisioned.

Figure 8:
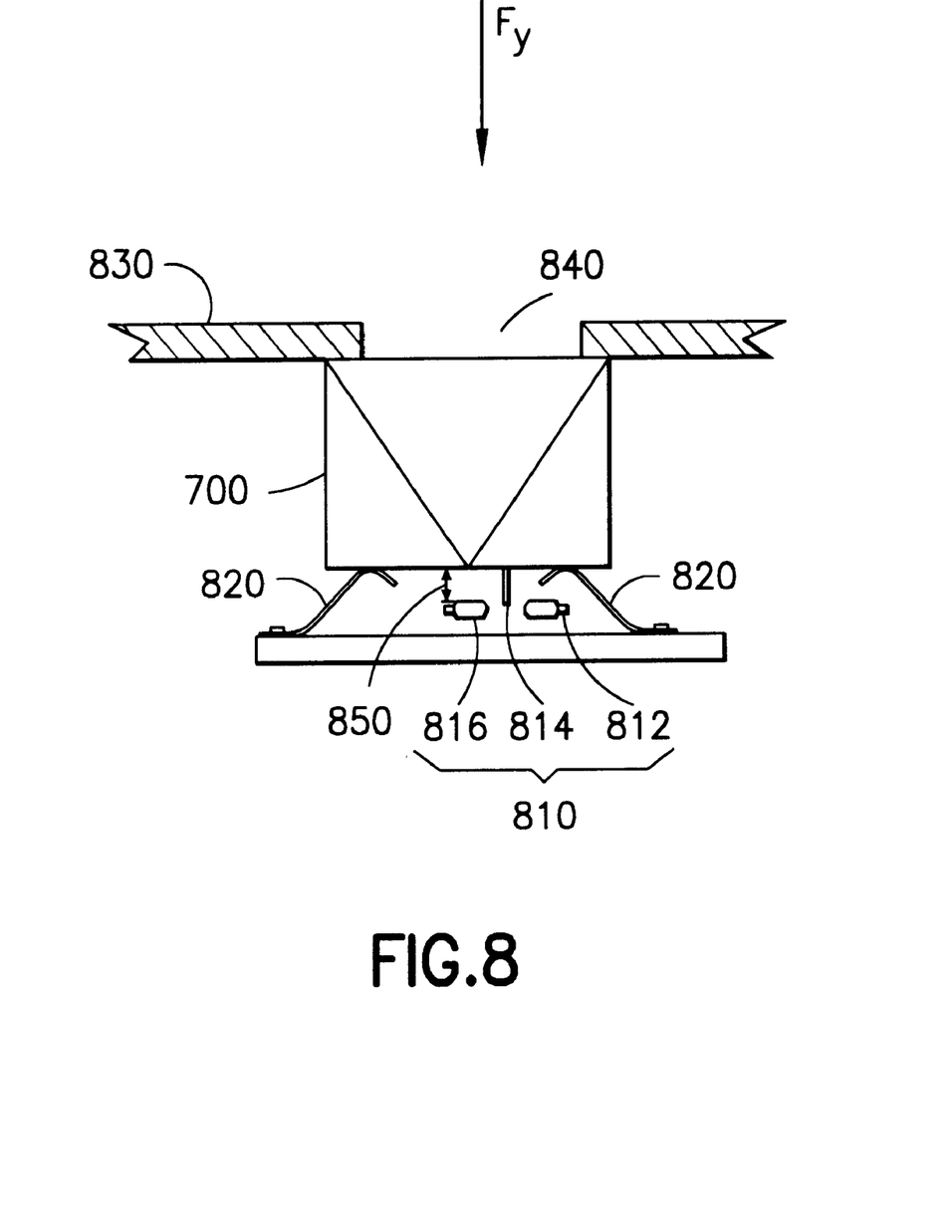
FIG. 8 is a block diagram showing a mechanical device that insures that the force normal to a measuring location is within a predetermined range.

An embodiment of the current invention which only mechanically restricts the force Fy in the negative y-direction 530 is shown by the force adjusting mechanism in FIG. 8. The prism 700 activates the photo-detector 812 only after sufficient force, Fy, has been applied. The prism 700 is pressed against the top plate 830 by the springs 820. A motion sensor 810 comprised of a photo-emitter 816, a photo-detector 812, and an optical stop 814 detects the vertical displacement 850 of the prism 700 which is caused by the subject's finger force through the opening for the finger tip 840. The motion is detected when the optical stop 814 block light being transmitted between the photo-emitter 816 and the photodetector 812. The displacement is controlled by the spring constant and the force, Fy, applied. Note that the prism guides are not shown. Other motion and/or position detectors are envisioned.

For clarity, we have omitted the low friction slide mechanism that allows the prism to move while maintaining proper orientation (in FIG. 8). A computer-sensed device 810, such as the opto-electronic coupler shown in FIG. 8, detects the displacement. In this way, the image can be captured while the force level is optimal or close to optimal.

Figure 9:
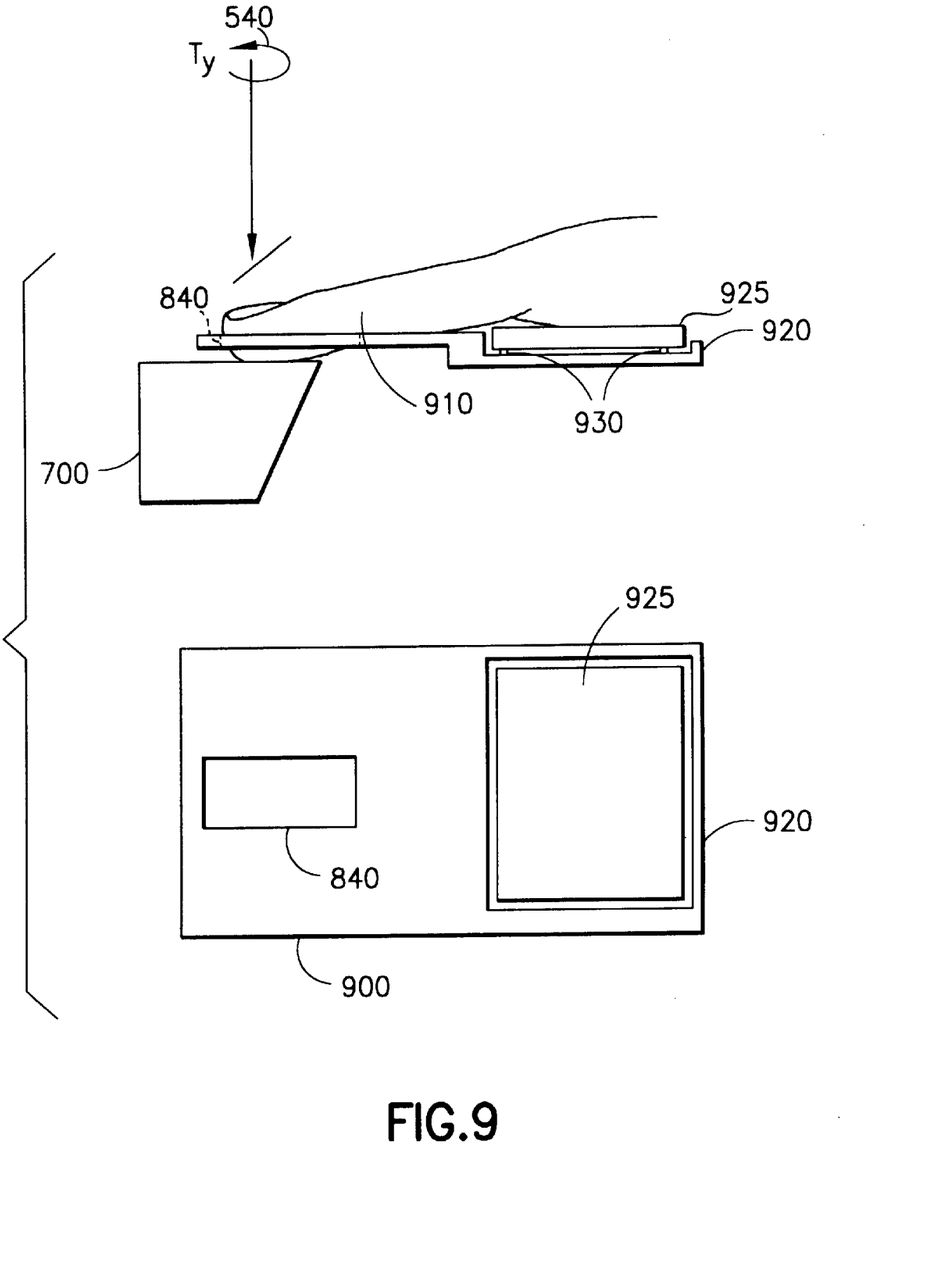
FIG. 9 shows a mechanical restrainer that can be used to limit forces in x-direction and torque in y-direction.

In an alternative embodiment, restrainers 900 for the palm, as shown in FIG. 9 activate the image sensor after sufficient force by the hand palm 925 on the palm rest 920 is exerted. The force exerted by the palm is measured by palm-force sensors 930. The idea behind this embodiment is that if the palm exerts sufficient force it is hard for a subject to exert torque Ty 540, especially at the finger tip where the image is taken. The fingerprint of finger 910 is acquired through fingerprint window 840. Many variations of these sensing techniques are possible and can be envisioned by a person skilled in the art. Not shown in this figure is an optional slotted support for the other fingers which prevents the application of force Fy in the y-direction 530. Naturally, the size and positioning of the palm support, finger support, and prism will depend on whether the device is to be used with one finger at a time, or with several fingers.

It is possible to implement the acceptance criterion in many ways. For example, with a palm restrainer as shown in FIG. 9, it will be possible to reject the image purely based on the vertical component of the force Fy since the other components of force (Fx and Fz) and torque (Ty) are controlled by the palm force sensor. Similarly, with the self-adjusting force device shown in FIG. 8, it will be possible to reject an image based on the torque using a torque measuring device as, for example, in FIG. 6. If restrainers are used (FIG. 9), the vertical force component Fy plays a decisive role. In a general scenario, torque Ty about the vertical axis (y-axis 530) and all three force components (Fx, Fy, fz) are to be considered.

In yet another embodiment, also intended for cooperative subjects, the fingerprint sensor is mounted on a simple platform instrumented to measure only the vertical force Fy. For example, an arrangement such as 930 of FIG. 9, used to detect the palm force, can be used to support the entire sensor unit and measure Fy. The image is captured when the force reaches a predetermined value.

Figure 10:
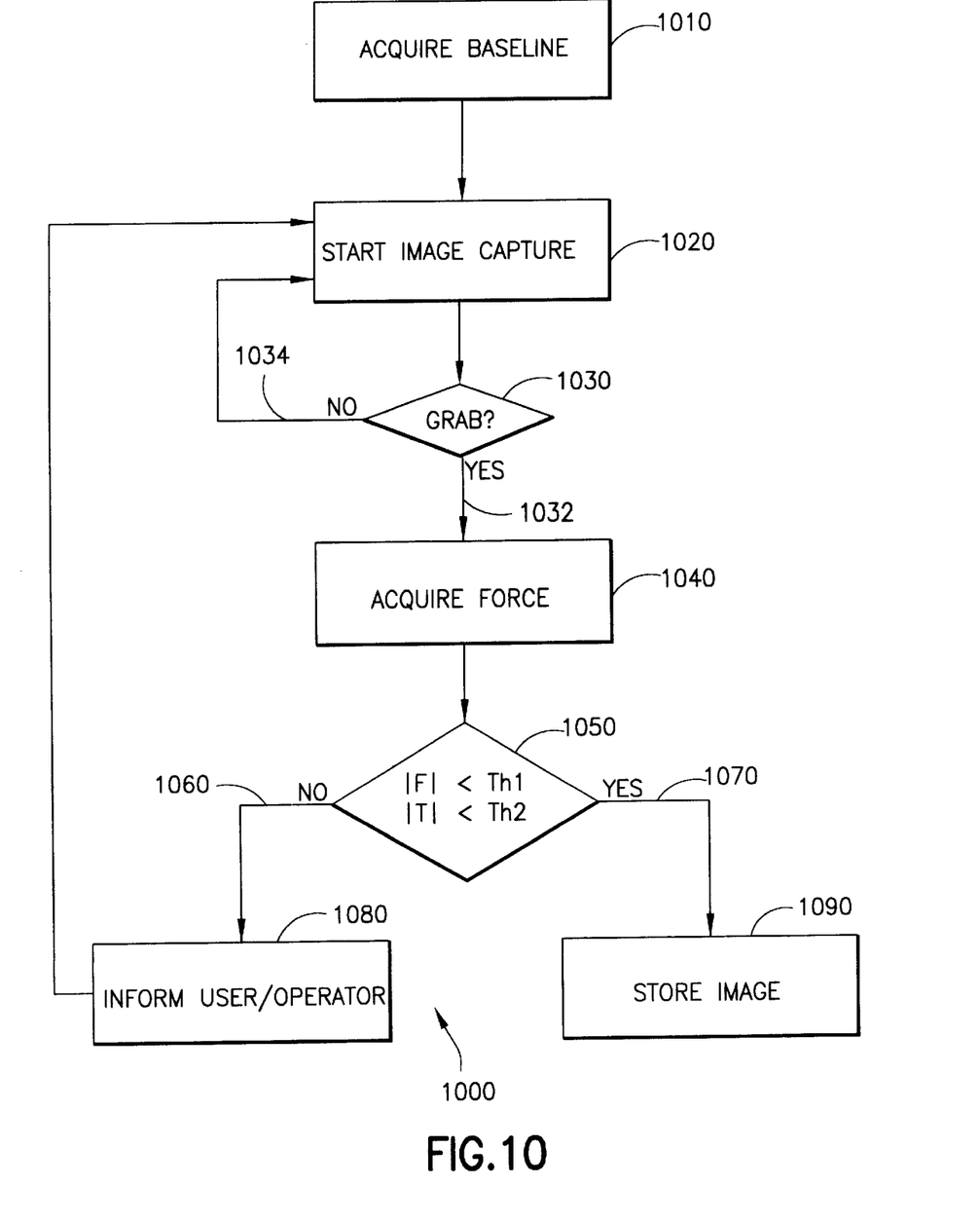
FIG. 10 is a flow chart showing the steps performed by the force/torque measurement method of this invention.

FIG. 10 is a flow chart 1000 showing the steps of the novel force/torque sensor-based distortion monitor/control for fingerprint image acquisition with live-scan equipment. The first step 1010 in the process is to acquire the baseline force and torque without the subjects finger present. The baseline force and torque can be different depending on the mounting mechanism and the inkless scan device used. For a small period of time, the force and torque is read from the sensors and averaged. After the baseline data is determined, the subject can place the finger to be imaged on the imaging device. At the image acquisition time 1020, which is either determined by the system operator or the subject or determined automatically (indicated by decision box 1030 and decision 1032 and 1034), a particular frame is acquired (1030, indicated by "Grab?" in FIG. 10) and the force and/or torque at that instant plus some small fraction of time is measured (and, if necessary averaged) 1040. If the resultant force and/or torque components are beyond the thresholds determined empirically (1060: $|F| \geq Th1$ or $|T| \geq Th2$), the user/operator is informed 1080 and the image is rejected. If, on the other hand, the resultant force and/or torque components are within the thresholds determined empirically (1070: $|F| \geq Th1$ or $|T| \geq Th2$), the image is accepted 1090 and stored on storage device 630 (FIG. 6). Here $|F|$ and $|T|$ represent the acceptable range of force and torque, respectively.

In a preferred embodiment (FIG. 6), Fy should be in the range of 300 to 1500 units, Fx should be less than 110 units, Fz should be less than 200 units. Torque Ty 540 around vertical axis 530 should be less than 250 units. Here one pound is equal to 700 units for force measures and one inch-pound is equivalent to 175 units for torque measures.

This invention can also be used in remote image acquisition of a biometrics of interest. For this purpose, the force and torque data is sent to the remote host along with the image using the network 666. The user is given visual feedback about the image quality. This results in more reliable imaging of the biometrics. For example, a fingerprint image of a suspect may be acquired in a police car using the image acquisition device 660, and force sensor 665—e.g. system 600 without computer 610. Here the network 666 can include a radio and/or phone connection. The image and force/torque information is then sent to a remote server located possibly in the police station. The remote server informs the officer about the image quality using the communication network 666.

The temporal variation in the sensor signals are an indication of the measurements originating from a live person, rather than an electronic image, e.g., a static measurement, (perhaps stolen) of the fingerprint of the live person. This feature can be exploited to detect if the biometric measurement is from a live person by differentiating static measurements from the measurements originating from a live person. When the biometric measurement is transmitted over a network 666 from a remote unattended sensor for authentication or identification of identity of a person; this invention can be used to further verify that the biometric measurement is originating from the live person as opposed to a biometric measurement fraudulently originating from a previous recording of similar measurements. For example, electronic transactions over internet need to ensure that the biometric being used to authenticate a transaction is not originating from a static pre-recorded signal.

In order to determine that the biometric is obtained from a live individual, the time varying force and/or torque signal are sent over the network in addition to the fingerprint image to indicate that the fingerprint image is being collected from finger interacting with the fingerprint sensor as opposed to a stored image of the fingerprint being submitted for authentication. In this embodiment, the biometric and force/torque data is taken over a time period sufficient to provide more than two or three force/torque readings. In a preferred embodiment, this takes between 5–10 frames (at 40 frames/sec). The amount of variation of force/torque, e.g., above a threshold, is used to verify that the biometric is a live image.

Additionally, when remotely authenticating or identifying a subject, the subject may be asked interactively by the remote system to move his/her finger in certain ways. In this embodiment, the system uses the different force/torque measurements (and optionally position of the image on the image acquisition device 660) to verify that the biometric is a live image. This will make breaking into the system by unauthorized subjects with pre-recorded biometrics of authorized subjects more difficult.

Tense subjects who exhibit signals of stress, like trembling, can also be detected by observing the variations in the measured force. Here if there is too much variation if force/torque the image indicates that the person providing the biometric is under stress. This makes forced authentication or identification of a subject harder.

Given this disclosure alternative equivalent embodiments will become apparent to those skilled in the art. These embodiments are also within the contemplation of the inventors.

We claim:

1. A system for ensuring the acceptability of a biometric image by measuring the force of contact, the system comprising:

a. an image capturing device that captures biometric images by contact and is receptive to one or more components of the force of contact;

b. an acceptor which accepts the biometric image only if one or more of the components is within a respective range of force having a predetermined upper limit and a predetermined lower limit, and c. means for detecting liveliness of the captured biometric measurement by measuring a variation of one or more of the force components over a time period.

2. A system as in claim 1, where the biometric image is a fingerprint image and the image capturing device creates the fingerprint image when a finger is placed on a finger receptive surface, and the finger receptive surface being responsive to one or more components of the force applied to the receptive surface by the finger, the finger receptive surface capable of producing a force signal used by the acceptor for each of the components of force.

3. The system, as in claim 2, where the finger receptive surface is responsive to only the component of force that is normal to the finger receptive surface.

4. A system, as in claim 2, where the range of force is between 0.42 and 2.14 pounds.

5. The system, as in claim 2, where the finger receptive surface uses total internal reflection (TIR) to form the image.

6. A system, as in claim 5, further comprising a restrainer that is capable of restraining the movement of the finger in one or more directions other than the normal direction.

7. A system, as in claim 6, where the restrainer restrains the finger.

8. A system, as in claim 6, where the restrainer restrains the wrist.

9. A system, as in claim 6, where the restrainer further restrains the finger from applying a torque about the normal direction.

10. A system, as in claim 6, where the finger receptive surface produces a torque signal representative of the torque and the acceptor accepts the biometric image only if the torque signal is within a torque range.

11. A system, as in claim 10, where the torque range is less than 1.42 pound inch.

12. A system, as in claim 2, where three orthogonal components of the force are determined.

13. A system, as in claim 1, where the biometric measurement is transmitted over a network for determining the identity of a person.

14. A system, as in claim 1, where the variation is used to determine that a subject is under stress.

15. A method for ensuring the acceptability of a biometric image comprising the steps of:

capturing the biometric image of a biometric;

acquiring one or more force components used by the biometric to create the biometric image;

rejecting the biometric image if the one or more of the force components is outside a range of force having a predetermined upper limit and a predetermined lower limit; and detecting liveliness of the captured biometric measurement by measuring a variation of one or more of the force components over a time period.

16. A method, as in claim 15, further comprising the steps of:

acquiring one or more torque components used by the biometric to create the biometric image; and rejecting the biometric image if the one or more of the torque components is outside a range of torque having a predetermined upper limit and a predetermined lower limit.

17. A system for ensuring the acceptability of a biometric image by measuring the force of contact, the system comprising:

an image capturing device that captures biometric images by contact and is receptive to one or more components of the force of contact including variations in said one or more components of the force of contact representing liveliness of a person; and an acceptor which accepts the biometric image if one or more of the components is within a predetermined range of force, said acceptor for determining liveliness and identity of the person from the captured biometric measurements including variations in said one or more components of the force of contact measured over a time period.

18. The system as in claim 17 wherein the biometric image is transmitted over a network for determining the identity of the person.

19. A system as in claim 17 wherein the variations are used to determine that the person is under stress.

* * * * *